United States Patent [19]
Cline

[11] 3,902,360
[45] Sept. 2, 1975

[54] APPARATUS FOR CONTROLLING THE CHARACTERISTICS OF ELECTRO-PNEUMATICALLY CONTROLLED FRICTION TYPE POWER ABSORPTION DEVICES

[75] Inventor: Edwin L. Cline, Pasadena, Calif.

[73] Assignee: Clayton Manufacturing Company, El Monte, Calif.

[22] Filed: July 3, 1969

[21] Appl. No.: 839,006

Related U.S. Application Data

[62] Division of Ser. No. 559,490, June 22, 1966, Pat. No. 3,453,874.

[52] U.S. Cl. ................................................ 73/135
[51] Int. Cl.² ........................................... G01L 3/16
[58] Field of Search ........ 188/180, 181, 182; 303/3, 303/20, 21; 318/6, 55, 57, 59, 66, 86, 253, 303/258, 269, 302, 309, 326, 335, 461; 73/117, 116, 134, 135, 117.3

[56] References Cited
UNITED STATES PATENTS

| | | | |
|---|---|---|---|
| 2,220,007 | 10/1940 | Winther et al. | 73/134 |
| 2,266,213 | 12/1941 | Kattwinkel | 192/3 |
| 2,322,022 | 6/1943 | Hewitt | 250/41.5 |
| 2,714,943 | 8/1955 | Whaley | 188/151 |
| 2,769,509 | 11/1956 | Watts | 188/1 |
| 2,860,737 | 11/1958 | Hines | 188/156 |
| 3,169,595 | 2/1965 | Shepherd | 180/1 |
| 3,193,057 | 7/1965 | Rudqvist | 188/180 |
| 3,237,996 | 3/1966 | Lucien | 303/21 |
| 3,277,357 | 10/1966 | Willis | 318/304 |
| 3,364,736 | 1/1968 | Bathurst et al. | 73/117 |

Primary Examiner—Charles A. Ruehl
Attorney, Agent, or Firm—Harry W. F. Glemser

[57] ABSTRACT

Apparatus for controlling a rotary power absorber while absorbing driving torque produced by a prime mover. The power absorber includes a housing containing fluid pressure operated brake elements that are actuatable hydraulically to provide retarding force. The control means for the brake applying means includes a tachometer generator, an electromagnetically operated air pressure control valve, and a transducer which converts the air pressure into hydraulic pressure for actuating the brake elements. The tachometer generator is driven at a speed proportional to the speed of rotation of the prime mover and actuates the air valve so that fluid pressure is applied to the brake elements in direct proportion, or according to a mathematical function of, the speed of the prime mover. An adjustable rheostat is interposed between the generator and the air valve for controlling the maximum retarding force at various engine speeds. The retarding force is increased and decreased at a rate faster than the changes in speed and torque of the prime mover to avoid stalling of the prime mover as frequently occurs when a constant load is sought to be applied to the prime mover and there is a momentary failure in power of the prime mover.

13 Claims, 6 Drawing Figures

Fig. 6. Engine and friction absorber power vs. speed. (Neglecting temperature effects)

APPARATUS FOR CONTROLLING THE CHARACTERISTICS OF ELECTRO-PNEUMATICALLY CONTROLLED FRICTION TYPE POWER ABSORPTION DEVICES

CROSS-REFERENCE

This application is a division of my co-pending application Ser. No. 559,490 filed June 22, 1966, now U.S. Pat. No. 3,453,874.

BACKGROUND OF THE INVENTION

1. Field of the Invention

This invention relates to equipment for testing the under-load performance characteristics of a prime mover by rotary friction type power absorption devices, and more particularly to novel electro-pneumatic load control means therefor. For convenience, such power absorption device will hereinafter simply be referred to as a friction absorber.

2. Description of the Prior Art

Currently available friction absorbers comprise a rotating brake drum or disk to be connected with the output shaft of the prime mover, and stationary friction pads or brake shoes that are engageable with the drum or disk to apply a retarding force thereto by frictional contact. The degree of retarding action is dictated by the force with which this frictional contact is made. The system that is used to apply this force is referred to as the "Load Control System." In simple friction absorbers this is a "fixed" force and only one speed versus power curve is possible for the reason that a constant retarding force is applied regardless of the speed or torque that is developed by the engine. In more flexible friction absorbers, the load control will allow the operator to manually vary the force of frictional contact. In the case of a hydraulically actuated system, for example, this is accomplished by the operator varying the fluid pressure. A series of speed versus power curves can then be obtained.

Due to the speed versus power characteristics of friction absorbers, the "fixed" force load control system is unsatisfactory because, for a given contact pressure of the brake shoes, the retarding force remains constant (neglecting the effects of temperature) and the same amount of torque will be absorbed throughout the speed range. Friction absorbers that produce a constant retarding force are further objectionable, in that such devices will cause the prime mover to stall in the event that the engine should momentarily miss or lose power for any reason. Such constant force friction absorbers are still further objectionable from the standpoint that they are unstable over the range in which the retarding force is equal to engine torque, which may cover a substantial speed range.

Since horsepower involves both speed and torque, the horsepower will increase and decrease directly with speed. In testing engines with friction absorbers, speed stability can be acquired only when the retarding force of the friction absorber increases and decreases with speed faster than that of the prime mover being tested. An ideal condition would be for the friction retarding force to start at zero with zero speed and change as a square of the speed change. This relationship is very close to the load imposed on a conventional automobile engine when the vehicle is driven on a level road and, hence, represents highly desirable loading characteristics to be simulated in practice. Such operational characteristics obviously cannot be attained with the "fixed" force load control for reasons stated above. Likewise, it is extremely difficult and practically impossible to establish and maintain such operating characteristics in a friction absorber by manual control of the force load, and, hence, such manual control leaves much to be desired.

SUMMARY OF THE INVENTION

Accordingly, there has long existed the need for load control means for friction absorbers that will render the same practical and avoid the principal objections thereto noted above. The load control means of the present invention is designed to obviate these objections and may take any number of forms. The load control means is made to simulate road conditions, to maintain stability at any speed, and to control the friction absorber means so that the retarding force of the friction absorber means is zero at zero engine speed and will rise and fall faster than the torque of the prime mover being tested. The present load control means contemplates an electro-pneumatic control system that is responsive to engine speed, and which can be adjusted and the load pre-selected to impose a retarding force of a given value at a given speed and automatically and correspondingly control the operating characteristics of the friction absorber in accordance with the foregoing relationship at all other speeds. The system is also capable of being remotely controlled by an operator.

The present load control means is applicable in principle to all types of friction absorbers, irrespective of whether the friction absorber is directly or indirectly coupled with the output shaft of the prime mover. A direct method would be to connect the prime mover shaft directly to the input shaft of the friction absorber, as in an engine dynamometer test stand setup. An indirect method would involve the incorporation of the friction absorber in a chassis dynamometer for testing engines of automobiles or trucks without removing the engine from the vehicle. In such case, rolls are usually provided to form a type of treadmill for the drive wheels of the vehicle and the friction absorber is then connected with a driven roll. Power from the engine would then be normally transmitted to the friction absorber through the vehicle transmission and differential. For illustrative purposes, and not by way of limitation, the load control means of the present invention is shown and described in connection with a friction absorber associated with a chassis dynamometer.

More specifically, the invention comprises a friction power absorber including a housing containing fluid pressure operated friction brake elements that are actuatable to provide retarding force. The control means for the brake applying means includes a tachometer generator driven at a speed proportional to the speed of rotation of the prime mover so that the current generated is directly proportional to the speed of the prime mover. Such current is conducted through an adjustable rheostat to an electromagnet associated with an air pressure control valve, which activates a transducer to correspondingly apply hydraulic pressure to the brake elements for controlling the maximum brake retarding force at various engine speeds. The retarding force is increased and decreased at a rate faster than the changes in speed and torque of the prime mover. The brake actuating pressure can be varied as the square of the speed of the prime mover, or any other suitable mathematical function of the speed of the prime mover.

Accordingly, the principal object of the present invention is to provide a load control apparatus for controlling the retarding force characteristics of a friction absorber, so that the retarding force produced thereby increases and decreases in value at a rate faster than the increases and decreases in driving torque applied to said absorber from a prime mover, and so that the applied retarding force value for any given prime mover speed can be pre-selected at will.

Another object is to provide a dynamometer, including a rotary friction absorber and control means for creating retarding force in opposition to driving torque applied thereto from a prime mover, designed so that the value of the retarding force will be changed in proportion to the occurring changes in driving torque and speed applied to said friction absorber by the prime mover.

A further object is to provide adjustable control means for a friction absorber, constructed so that various value relationships between retarding force and driving torque can be pre-selected.

Another object is to provide apparatus for controlling the friction characteristics of a friction absorber constructed to automatically vary the retarding force produced by the friction absorber in a pre-selected manner and as a function of the speed of rotation of the shaft supplying driving torque to said unit.

A more specific object is to provide electro-pneumatically operated load control means for a friction absorber, wherein electrical means responsive to the speed of the prime mover being tested is utilized to regulate a pneumatic pressure control system to actuate a power absorber in accordance with speed changes of the prime mover, to correspondingly vary the retarding force created by said friction absorber to provide a pre-selected load on the prime mover at a given speed.

Another object is to provide load control means for a friction absorber that can be remotely controlled and which allows pre-selection of the degree of load to be applied to a prime mover.

Other objects and many of the attendant advantages of the invention will become readily apparent from the following description, when taken together with the accompanying drawings.

DESCRIPTION OF A PREFERRED EMBODIMENT

Figures 1, 2:
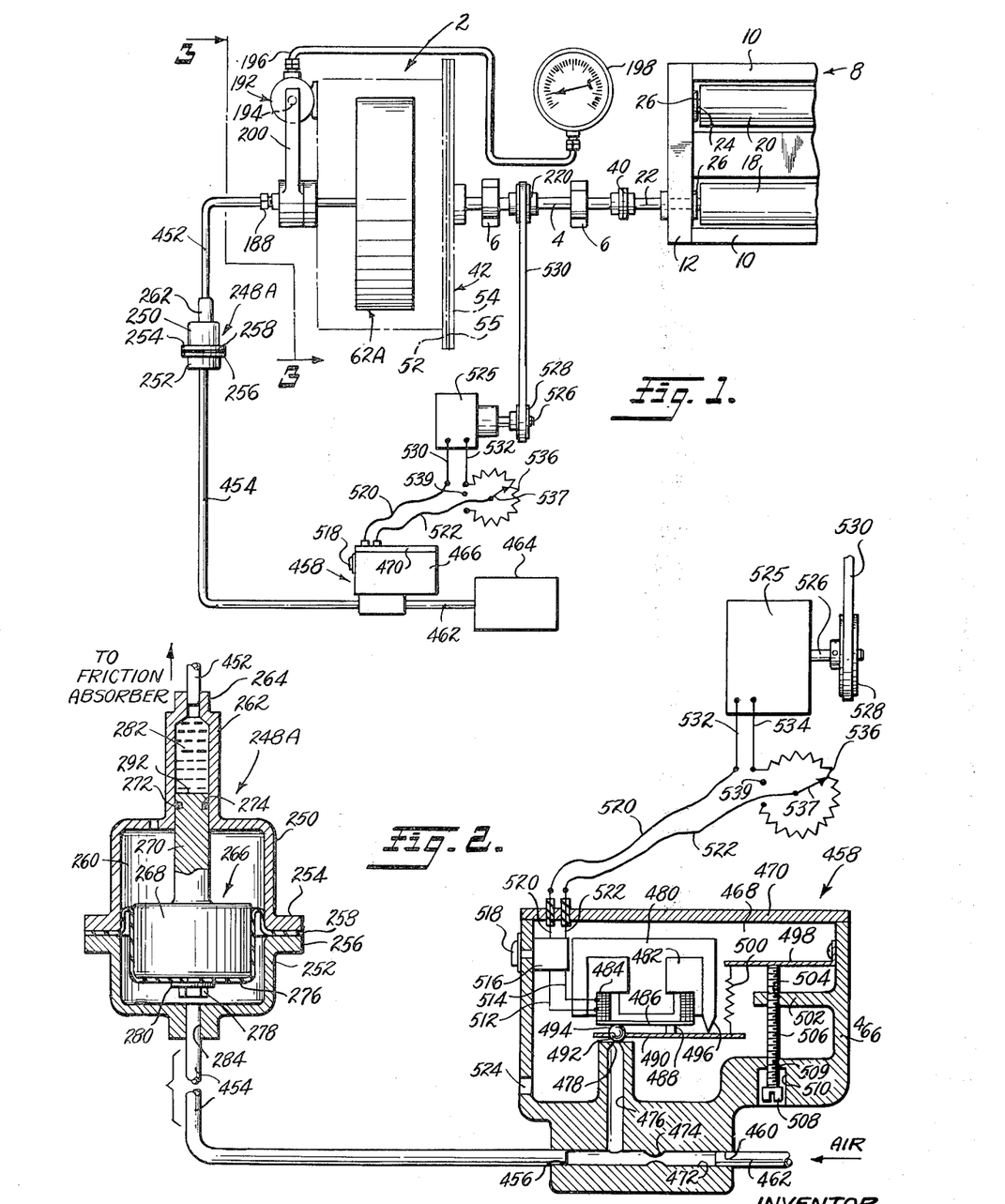
FIG. 1 is a diagrammatic plan view of a chassis dynamometer embodying the invention wherein the control apparatus comprises a pneumatic-hydraulic pressure transducer, an electromagnetic responsive valve for supplying air under pressure to said transducer, and a tachometer generator for producing an electrical signal to operate said valve.
FIG. 2 is a fragmentary diagrammatic sectional view of the control apparatus of FIG. 1, particularly showing the internal construction of the pneumatic-hydraulic pressure transducer, and of the electromagnetic responsive air pressure control valve.

Referring now to FIG. 1, a portion of a conventional chassis dynamometer for testing motor vehicles is shown for use in conducting under-load testing of the engine of the motor vehicle, the dynamometer including absorber assembly 2 to which driving torque is supplied by an input shaft 4 supported by spaced bearings 6. Driving torque is transmitted indirectly from the engine of the motor vehicle undergoing test to the input shaft 4 by a roll assembly 8, upon which the driving wheels (not shown) of the motor vehicle are supported.

The roll assembly 8 has a generally rectangular frame comprised of longitudinal side members 10, interconnected by transverse end members 12, only one of which is shown. The dynamometer includes two pairs of rolls, one of which pairs consists of the parallel rolls 18 and 20 mounted on shafts 22 and 24, respectively, which are supported by bearings 26 mounted on the transverse members 12. The shaft 22 extends beyond the end member 12, and is connected by a coupling 40 with the input shaft 4 of the power absorber assembly 2. Thus, when the engine of a motor vehicle positioned with one of its drive wheels disposed on the rolls 18 and 20 is operated to rotate said rolls, the wheel will drive the roll 18 to thereby transmit driving torque from the vehicle engine to the input shaft 4 of the power absorber assembly 2.

Figure 4:
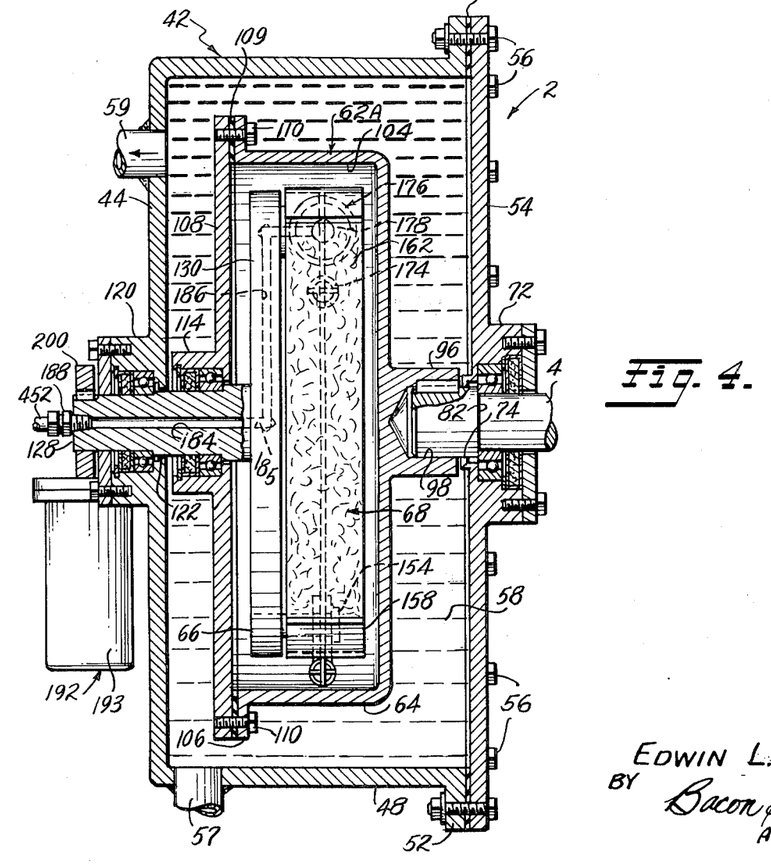
FIG. 4 is an enlarged vertical sectional view through the friction absorber, taken along the line 4—4 of FIG. 3, showing certain details of construction of the friction absorber, and the manner in which it is mounted in a coolant casing.

Referring now in particular to FIG. 4, the power absorber assembly 2 includes a coolant-receiving casing 42. The front of the casing 42 is open and is surrounded by an external flange 52. A cover plate 54 and a gasket 55 are mounted on the flange 52 to close and seal the casing 42, and are secured to said flange by bolts 56. The casing 42 has an inlet pipe 57 connecting to an opening in the bottom wall 48 for admitting liquid coolant 58 into the casing. An outlet pipe 59 is connected to an opening near the top of the rear wall 44 of the casing for the discharge of said coolant.

The cover plate 54 has a centrally positioned boss in which the input shaft 4 is rotatably mounted. The rear wall 44 of the casing 42 has a central boss 120 through which extends a bore 122 aligned with a bore 74 in a boss 72 on the cover plate 54.

Mounted within the casing 42 is a friction absorber 62A, which includes a rotor element or drum 64, and a stator element 66, carrying movable brake shoes or friction pad elements 68. The drum 64 comprises a hub 96 having a socket 98, in which is keyed an enlarged end 82 of the shaft 4. A circular plate 108 and a gasket 109 are secured to a flange 106 on the drum 64 by cap screws 110.

The stator 66 comprises a cylindrical shaft portion 128, which projects through a boss 114 on a circular plate 130 of substantially smaller diameter than the inner diameter of the drum 64. The shaft 128 is rotatably mounted in the boss 114 and is also rotatably mounted in the boss 120 on the casing 42.

The friction pad means 68 comprises a pair of conventional arcuate brake shoes 158 (one of which is shown in FIG. 4), each having brake lining material 162 secured thereto for frictionally engaging the inner cylindrical surface of the drum 64 when said shoes are moved outwardly, as will be readily understood. The plate 130 carries a pair of adjusting pins 154 upon which the brake shoes 158 are pivotally supported.

Mounted on the plate 130 between the upper ends of the brake shoes 158 is a conventional fluid pressure operated brake actuator unit 176, which includes a cylinder 178 having the usual pair of piston-operated rods (not shown) extending from the opposite ends thereof, it being understood that the rods are moved outwardly by fluid pressure acting on pistons within the cylinder 178 to expand the brake shoes 158. When fluid pressure is relieved in the cylinder 178, a return spring 174 functions to retract the brake shoes 158 out of engagement with the drum 64.

The shaft 128, FIG. 4, has an axial bore 184 which communicates at its inner end with an axial bore 185 and a radial bore 186 in the plate 130. The radial bore 186 communicates with the interior of the cylinder 178 for conducting fluid pressure to and from said cylinder. The outer end of the bore 184 is threaded to receive a fitting 188 to which a conduit 452 is connected. Thus, by supplying fluid under pressure through the conduit 452 the acuuator unit 176 can be operated to move the friction pad means 68 into frictional engagement with the drum 64. The force with which such engagement is made will control the value of the resultant retarding force when the rotor or drum 64 is revolved. The magnitude of such force can be controlled by varying the value of the fluid pressure applied through conduit 452.

Figure 3:
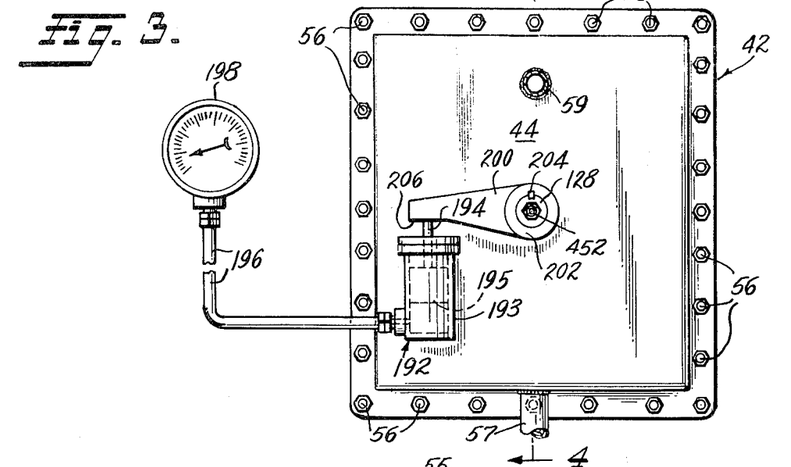
FIG. 3 is an end elevational view of the friction absorber as seen along the line 3—3 of FIG. 1, and showing a torque arm for actuating a pressure transmitting device connected to a guage for indicating the torque being absorbed.

Mounted on the rear wall 44 of the coolant casing 42, FIG. 3, and spaced from the shaft 128, is a transducer 192 for converting angular movement of the stator 66 into fluid pressure, said transducer including a housing 193 containing oil. An upwardly projected push rod 194 extends from a piston 195 mounted in the housing 193. A conduit 196 full of oil is connected to the transducer 192, and leads to a fluid pressure operated gauge 198. The transducer 192 is constructed so that when the push rod 194 is depressed by mechanical force, hydraulic pressure will be produced by the piston 195 within the transducer 192 and will be transmitted to the gauge 198 through the conduit 196. The hydraulic pressure will be relieved when the mechanical force applied to the push rod 194 is discontinued.

On the outer end of the shaft 128 is an arm 200 having a boss 202 fixed thereto by a key 204. The outer end 206 of the arm 200 rests on the push rod 194 of the transducer 192. When the brake actuator unit 176 is operated to move the friction pad means 68 into frictional engagement with the drum wall 104 and the rotor 64 is rotated counter-clockwise (as viewed in FIG. 3), the shaft 128 and the stator 66 will tend to rotate therewith. Angular movement of the stator 66 will engage the outer end 206 of the arm 200 with the push rod 194, producing a fluid pressure signal for transmission to the gauge 198. The valve of the signal will be proportional to the effective retarding force of the friction absorber 62A and, hence, the gauge 198 can be calibrated accordingly in foot pounds.

When the rotor 64 is rotated while the friction pad means 68 is in engagement with the drum wall 104 to produce a retarding force, heat will be generated between the relatively stationary friction brake bands 162 and the moving surface of the drum wall 104. This heat is dissipated by passing the coolant 58 through the casing 42.

The load control apparatus for the friction absorber 62A includes the conduit 452 connected at one end to the fitting 188 for supplying fluid pressure to the brake actuator unit 176, the other end of the conduit 452 being connected to an air pressure-hydraulic pressure transducer 248A, shown in crosssection in FIG. 2. The transducer 248A includes an upper housing section 250 and a lower housing section 252 having flanges 254 and 256, respectively, on their confronting ends and between which the outer margin of a flexible rolling diaphragm 258 is clamped. The housing section 250 has a hollow lower portion 260, and a reduced hollow upper portion 262, the latter terminating in a boss 264 to which the conduit 452 is connected.

Received within the housing sections 250 and 252 is a member 266 having a lower piston 268, and a relatively reduced upper plunger 270 slidably received within the portion 262 of the housing section 250. The plunger 270 carries a seal 272 in a groove 274 near its upper end. The lower face 276 of the piston 268 is engaged with the diaphragm 258, and the latter is secured thereto by a bolt 278 and a washer 280. The conduit 452 and the chamber in the housing portion 262 above the plunger 270 are filled with a suitable hydraulic fluid 282. Thus, when the member 266 is moved upwardly, the fluid 282 will be pressurized by the plunger 270 for operating the brake actuator unit 176.

The chamber in the lower housing section 252 has a port 284 communicating therewith, to which is connected one end of a conduit 454 leading from an air pressure control valve 458 connected to an air pressure source 464. When air pressure is supplied to the housing section 252 beneath the rolling diaphragm 258, the piston 266 will be moved upwardly to exert force on the fluid 282. The area 276 of the piston 266 against which air pressure acts through diaphragm 258 is several times greater than the area of the upper end face 292 of the plunger 270, so that the pressure on the surface 276 will be correspondingly multiplied in the fluid 282.

The control valve 458 is operable electromagnetically and automatically to control the value of air pressure transmitted from the source 464 to the lower section 252 of the transducer 248A, as will be pointed out more fully hereinafter.

Referring to FIG. 2, the air pressure control valve 458 includes a housing 466 having an upwardly opening chamber 468 therein, closed by a cover 470. The inlet port 460 and the outlet port 456 are connected by a passage 472, having a restricted orifice 474 therein. Downstream of the orifice 474, a vertical passage 476 intersects the passage 472, and extends upwardly into the chamber 468 to terminate in an air nozzle 478.

Mounted within the chamber 468 above the air nozzle 478 is a permanent magnet 480, including an annular chamber 482 within which is received a vertically movable magnetic coil 484. A mounting plate 486 is secured to the lower side of the coil 484, and has a fulcrum 488 attached thereto at a position spaced from the air nozzle 478. A beam 490 is attached to the fulcrum 488 for pivotal movement thereabout, and has an opening 492 positioned directly above the air nozzle 478. A ball 494 is seated in the opening 492 and is held between the beam 490 and the plate 486, the undersurface of said ball projecting through the opening 492 and being seatable on the air nozzle 478 for closing the same when the coil 484 moves downwardly.

The permanent magnet 480 includes a pointed fulcrum 496 positioned outwardly of the fulcrum 488, and on which the beam 490 is balanced. A flexible arm 498 is secured at one end to the housing 466, and a tension spring 500 is connected between the free end of said arm and the adjacent end of the beam 490. A web 502 projects inwardly from the housing 466 beneath the flexible arm 498, and has a threaded bore 504 positioned below about the midpoint of the flexible arm 498. The housing 466 has a socket 510, the bottom wall of which has an opening 509 in which a screw 506 is threaded so that its upper end is engaged with the flexible arm 498. The head 508 of the screw 506 is received in the socket 510, so that the screw 506 can be adjusted from outside the housing 466. When the screw 506 is threaded inwardly, the flexible arm 498 moves upwardly, increasing the tension in the spring 500 urging the outer end of the beam 490 upwardly. The tension spring 500 urges the beam 490 to pivot about the fulcrum 496, so as to urge the ball 494 toward the air nozzle 478 to close off flow through the same. Thus, by adjusting the screw 506, a pre-load can be placed on the beam 490.

When the coil 484 is energized, it will move downwardly to move the free end of the beam 490 and the ball 494 toward the air nozzle 478, the degree to which siad nozzle is closed being determined by the extent of the downward movement of the beam 490, which latter is determined by the value of the current supplied to the coil 484, the downward movement increasing with increases in the current.

The coil 484 has a pair of leads 512 and 514 extending therefrom to a range adjusting rheostat 516 mounted in the housing 466 and having an external operating knob 518. A pair of leads 520 and 522 extend from the rheostat 516 through the cover 470 of the housing 466, for supplying electrical current thereto. The housing 466 has a vent port 524 for exhausting air that has passed through the air nozzle 478.

A tachometer generator 525 is arranged to be driven by the power input shaft 4 and comprises a shaft 526 having a pulley 528 thereon which is connected with the pulley 220 by a belt 530. The generator 525 has a pair of leads 532 and 534 extending therefrom, the lead 532 being connected directly with the lead 520. The lead 534 is connected to one side of a variable rheostat 536, the sweep arm 537 of which is connected to the lead 522. The generator 525 is arranged to generate an electric current, the value of which will be directly proportional to the speed of rotation of the power input shaft 4. This current is then transmitted through the rheostat 536 to the electromagnetic responsive valve unit 458, where it is employed to energize the coil 484 for varying the air pressure transmitted through the conduit 454 to the transducer 248A. Thus, the arrangement shown in FIGS. 1 and 2 will produce retarding force which is directly proportional to the speed of rotation of the power input shaft 4, and hence to driving torque. The power characteristics of the apparatus shown in FIGS. 1 and 2 is indicated by the curve I in FIG. 6, the power absorbed by the friction absorber 62A varying with the square of the engine speed.

The value of the retarding force can be easily set in the embodiment of FIGS. 1 and 2 by merely adjusting the rheostat 536 to add, or remove, electrical resistance to or from the circuit. The greater the electrical resistance added by the rheostat 536, the less will be the current transmitted to the coil 484, and the less will be the resultant pressure exerted by the hydraulic brake actuator unit 176 on the friction pad elements 68 for urging them into frictional engagement with the rotor drum 64. The rheostat 536 also includes an "OFF" terminal 539, to which the sweep arm 537 can be moved to interrupt the circuit to the coil 484. The prime mover can then be operated throughout its speed range without the friction absorber 62A being operated.

To place the dynamometer apparatus of FIGS. 1 to 4 in operation, a source of water or other coolant 58 is first connected to the conduit 57, and flow of said coolant through the casing 42 is started. With the drive wheels of a motor vehicle in place on the roll assembly 8, the engine of the vehicle is started and the transmission is engaged to cause the wheels to revolve and drive the rolls 18 and 20. Driving torque is then transmitted by the roll 18 to the input shaft 4 of the friction absorber 62A. As the power input shaft 4 rotates, the tachometer generator 525 will be driven at a speed proportional to the speed of rotation of said shaft.

The setting for the variable rheostat 536 can be fixed and not altered, or varied during testing to provide the desired friction characteristics of the friction absorber 62A for the particular prime mover being tested. After the rheostat arm 537 is properly set, and with the tachometer generator 525 operating, electrical current will be generated in proportion to the speed of the prime mover to energize the air pressure control valve 458. The resulting air pressure in the transducer 248A will produce a corresponding hydraulic pressure, which will be transmitted through the conduit 452 to the brake actuator unit 176, the value of which, as has been explained, is determined by the speed of rotation of the input shaft 4.

In operation, air under pressure is supplied to the input port 460 of the valve 458 through the conduit 462 and flows through the restrictor orifice 474. When the coil 484 is deenergized, the ball 494 will be out of engagement with the air nozzle 478, and all of the air flowing through the orifice 474 will flow through the passage 476, discharge through the air nozzle 478, and be exhausted from the housing 466 through the vent port 524. The air nozzle 478 is larger in diameter than the restrictor orifice 474, and the ball 492 and its supporting beam 490 are designed so that when the ball is fully raised, the air nozzle 478 will be substantially unobstructed. Under these conditions, substantially no pressure build-up can occur in the conduit 454 leading to the transducer 248A. However, the screw 506 is normally adjusted so that the ball 494 will partially restrict the air nozzle 478, thus creating a slight preload pressure in the conduit 454.

When electric current is supplied to the coil 484, the same will move downwardly a distance in proportion to the value of the current supplied thereto. As the coil 484 moves downwardly, the ball 494 will gradually close off the air nozzle 478, obstructing air flow therethrough and causing an increase in pressure in the conduit 454. This increase in air pressure is conducted to the transducer 248A where a hydraulic pressure signal is generated for transmission through the conduit 452 to the hydraulic brake applying unit 176 of the friction absorber 62A. The dimensions of the air nozzle 478 and of the ball 494 may be selected so that the size of the space through which air is discharged from the passage 476 varies so as to cause variations in pressure within the conduit 454 in direct proportion to the value of current supplied to the coil 484 or in some mathematical relationship to the current value. It is thus seen that the force with which the friction pad elements 68 are urged into engagement with the drum 64 in FIGS. 1 and 2 will also be mathematically proportional to the value of the current supplied to the coil 484.

For any given setting of the rheostat arm 537, it is seen that zero pressure will result at zero speed of the generator shaft 526, with the result that retarding force must necessarily also be zero at zero speed. The control apparatus of FIGS. 1 to 4, therefore, can be designed to cause the retarding force and speed of the friction absorber 62A to have a mathematical relationship to speed, for example, the relation represented by the curve C or D in FIG. 5. The value represented by this curve can be shifted to the right or to the left in FIG. 5 merely by increasing or decreasing the area of opening of the valve 478–492–494. This results in corresponding decreases and increases, respectively, in the signal pressure transmitted through the conduit 454 at any given speed of the shaft 526. By using an adjustable rheostat 537, it is possible to operate the control system in conformance with any one of several possible resultant torque curves whose character is predetermined by the mathematical relationship of the pressure in conduit 454 to speed.

As the speed of the prime mover, and hence of the rotor 64 of the friction absorber 62A is changed, the signal pressure to the brake actuator unit 176 will be changed directly with the speed changes. The result is, that the retarding force produced by the friction absorber 62A will have the characteristics of the curve C in FIG. 5, and the power curve for the friction absorber will be as shown at I in FIG. 6.

Figure 5:
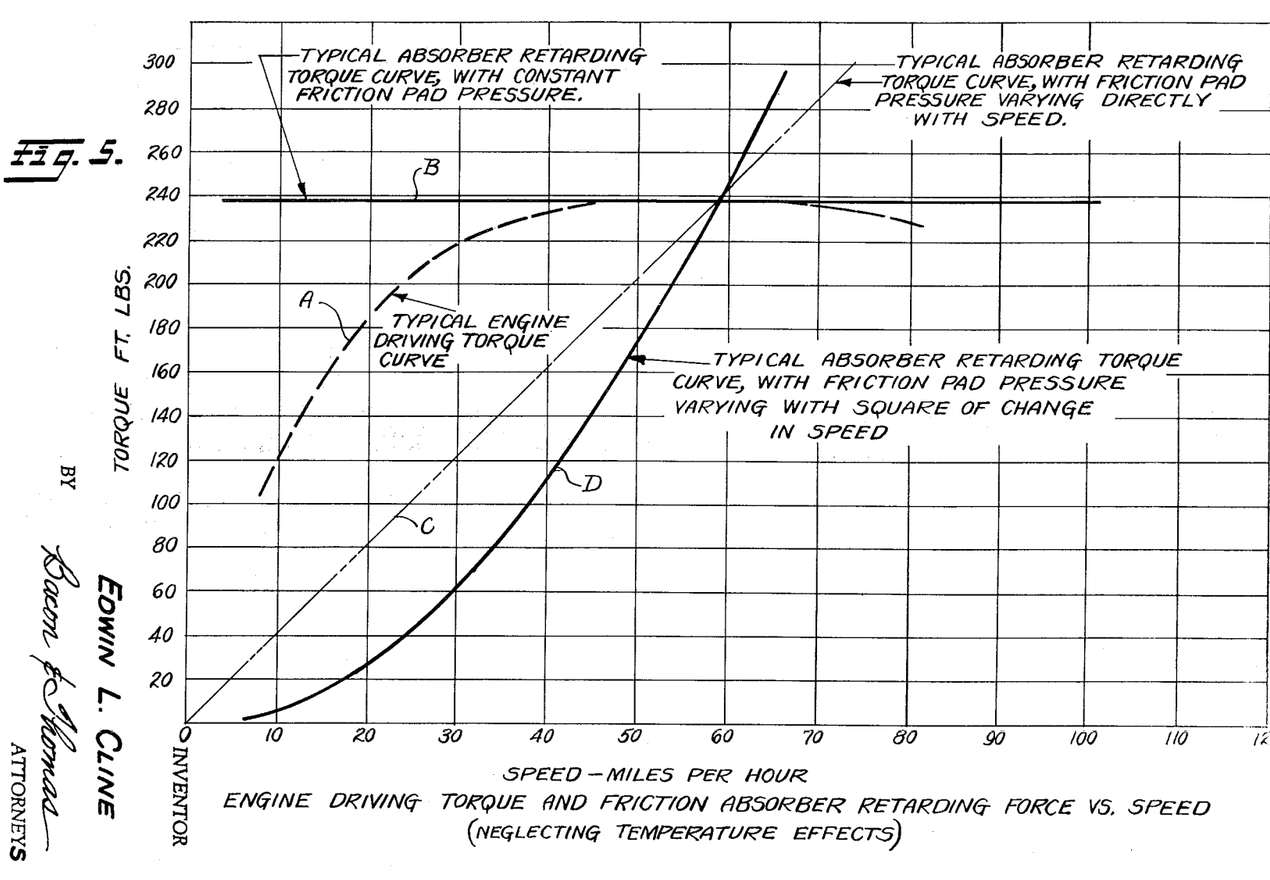
FIG. 5 is a graph comparing engine driving torque in foot pounds and friction absorber retarding force, with vehicle speed in miles per hour and showing in particular by the curves, the retarding force produced by controlling differently the pressure applied to the friction elements.

Referring further to the graph of FIG. 5, the driving torque-speed characteristics for a typical motor vehicle engine is indicated by the curve A. Here, the values of torque in foot pounds are plotted as ordinates, and the corresponding vehicle speeds in miles per hour are plotted as abscissas. It is seen that the engine driving torque rises rapidly with increasing engine speed, from zero to about 25 miles per hour, and that thereafter driving torque increases at a slower rate with engine speed, until at about 47 miles per hour the driving torque becomes stabilized. Over the range from about 47 miles per hour to about 65 miles per hour, no appreciable increase in driving torque occurs. Above about 65 miles per hour, the value of engine driving torque decreases with increasing engine speed.

One manner of operating the friction absorber 62A would be to supply a constant fluid pressure to the brake actuator 176, the result of which is illustrated by the curve B in FIG. 5, wherein it is seen that the value of the retarding force would then be constant over the complete range of engine speed, from zero miles per hour upwardly.

While under-load testing a motor vehicle engine, or other prime mover, it is desirable to operate the engine at several different stable operating speeds. When using friction dynamometer equipment, such a stable speed is obtained by matching the value of the generated retarding force to the value of the driving torque, until operation of the prime mover at the desired preselected speeds results. Turning to the curves A and B in FIG. 5, it is seen that between about 45 and about 65 miles per hour the engine driving torque curve A is parallel with the constant value retarding force curve B. Because of this parallel relationship, it is practically impossible over this common driving speed range to match retarding force to the driving torque and effect stability. The result is a "hunting" action, or a "running wild" of the engine, and hence true performance testing of the engine is not possible.

Another problem, with a constant retarding force, results from the fact that in the lower speed ranges, driving torque decreases rapidly in value with decreased speed, as is shown by the curve A, FIG. 5. Thus, assuming that under-load testing is in progress at a substantially stable engine speed of 30 miles per hour, a problem arises if the engine should misfire or momentarily lose power. While there would then be an immediate decrease in driving torque, the retarding force would remain constant, and as the driving torque began to decrease, the constant retarding force would act to further slow the engine, and rapid decrease in driving torque would occur until the engine completely stalled. This condition can be alleviated by having the retarding force increase and decrease with changes in speed, and hence with driving torque.

It has been found that for the most efficient engine operation, the value of the retarding force should preferably be substantially zero at zero engine speed, and should rise and fall faster than the changes in the driving torque output of the prime mover being tested. When the value of the retarding force is thus varied, the power absorbed, versus engine speed, will increase and decrease more rapidly than engine power output.

Referring again to FIG. 5, curve C represents a situation where retarding force is varied directly with changes in engine speed, which can be done by varying the value of the fluid pressure supplied to the brake actuator unit 176 in direct proportion to changes in the speed of the engine being tested.

Thus, at zero speed the retarding force is also zero. As the engine speed increases, there is a corresponding increase in driving torque, and similarly, when engine speed decreases the retarding force changes accordingly, It is seen that the retarding force curve C cuts sharply across the typical driving torque curve A, at about 58 miles per hour, and that there are no regions where the retarding force curve C is parallel with the engine driving torque A. Thus, retarding force can easily be matched with driving torque to provide a stable operating speed, and there is no problem of engine stall occurring when there is a temporary decline in driving torque, because the retarding force follows such decline.

In the case of automotive engines, it has been found that the best relationship for retarding force is to have the value thereof increase and decrease approximately the square of the change in speed, and to be zero at zero speed. The reason this is a nearly ideal condition is that it very closely simulates the load actually imposed on a conventional automobile engine while the vehicle is being driven on a level road. Such a retarding force versus speed curve is shown at D in FIG. 5. Such retarding force can be created by varying the value of the pressure on the friction elements 162 in accordance with the square of the engine speed.

The load control apparatus or system of the present invention will vary, with changes in speed, the pressure with which the friction elements 162 are urged into frictional engagement with the drum wall 104 of the rotor 64. The system, therefore, is effective to vary the value of the retarding force produced in proportion to the driving torque. The load control apparatus is designed so that the retarding force versus speed curve of the friction absorber 62A can be shifted to the right or left around zero in FIG. 5 to obtain nearly any desired value of retarding force at any given speed, whereby nearly any stable operating speed can be established for under-load testing of a prime mover.

Figure 6:
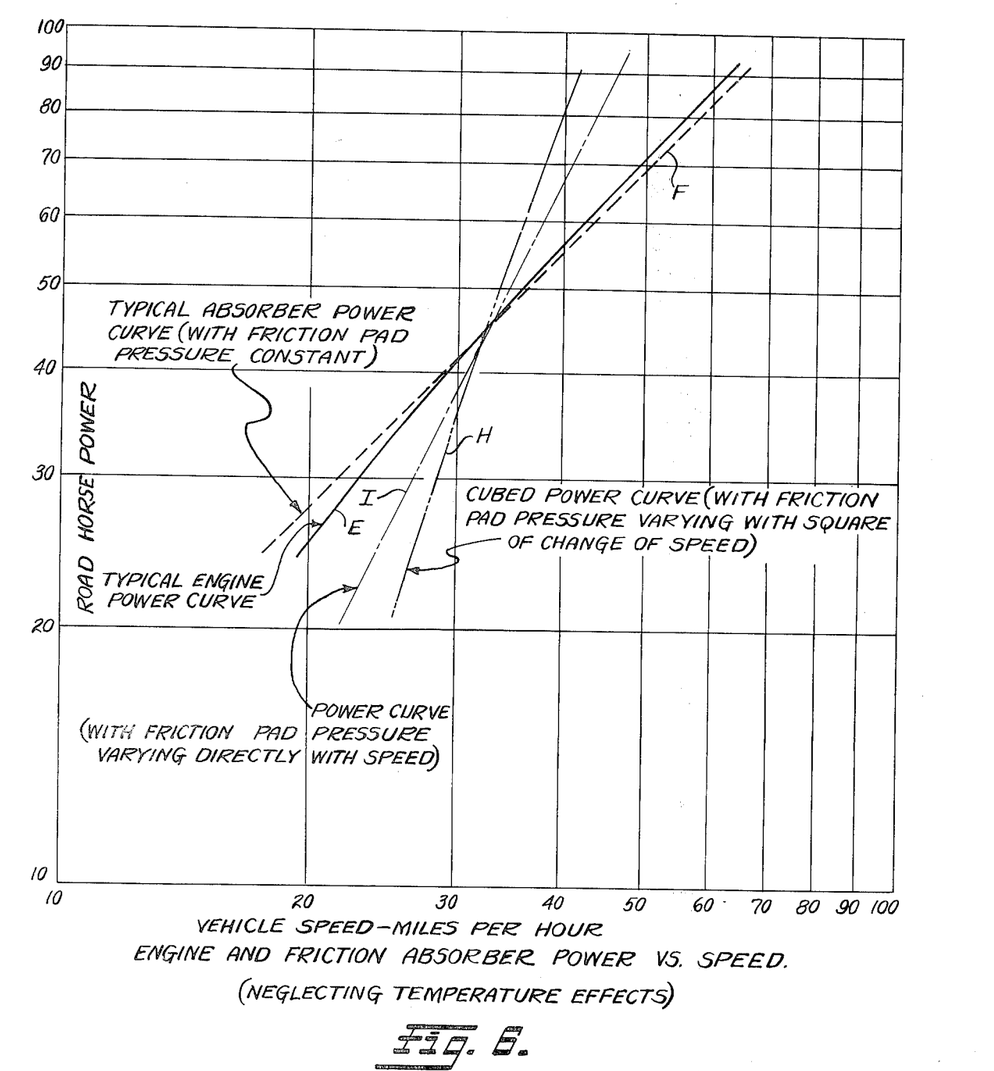
FIG. 6 is a graph comparing road horsepower absorbed by the friction absorber with vehicle speed in miles per hour, and showing typical power curves for the friction absorber resulting from using the electro-pneumatic load control system of the present invention.

FIG. 6 is a graph wherein road horsepower is plotted against vehicle speed in miles per hour, the curve E showing a typical power curve for an automobile engine. A typical power curve for a friction absorber wherein the retarding force is constant is shown at F, and it is seen that the slope of the curve F is substantially less than that of the curve E, whereby the power absorbed by the friction absorber 62A rises and falls at a slower rate with speed than does engine power. On the other hand, the curves H and I are plots of examples of the power absorbed by the friction absorber 62A against engine speed in terms of vehicle speed in miles per hour, and it is seen that in these instances the absorbed power curves have slopes substantially steeper than the engine power curve E, whereby the absorbed power rises and falls at a rate faster than the increases and decreases in engine power. By way of explanation, very little engine testing is done at speeds of 20 miles per hour or less. Hence, the values for these speeds do not appear in FIG. 6. However, if one considers the portions of the curves E, I and H in the zone, for example, of the increase of the 30 to 40 horsepower absorbed by the power absorption device, it will be seen that for curve E, the increase in speed for the 10 horsepower increase in power absorption if about 23 to 29, or an increase of 6 miles per hour; for curve I, the increase in speed for the same range is about 27 to 30.5, or 3.5 miles per hour; and for curve H, the increase in speed is from about 28.5 to 31, or 2.5 miles per hour. These values clearly show that the power absorbed rises and falls at a rate faster than the increase in engine power, or as plotted, vehicle speed in miles per hour.

The arrangement of FIGS. 1 to 4 thus makes it possible to easily attain any desired stable operating speed for a prime mover during under-load testing, and because retarding force and absorbed power rise and fall at faster rates than driving torque and engine power, rapid response of the friction absorber 62A to changes in vehicle speed is assured and the problem of stalling in instances where the prime mover momentarily loses power is eliminated.

Under certain conditions, in the embodiment of FIGS. 1 and 2, it is possible to substitute a pneumatically operated brake actuator unit in place of the hydraulic brake actuator unit 176, for moving the friction pad means 68 into engagement with the rotor drum 64. If a pneumatic brake actuator unit is substituted for the hydraulic actuator unit 176, then the air-pressure fluid-pressure transducer 248A can be eliminated, and the friction pad elements 68 would then be operated directly by the air pressure output from the valve 458.

The embodiment d the invention described employs a friction absorber 62A utilizing a cylindrical brake drum wall 104 and brake shoes 158 having lining material 162 secured thereto, which arrangement resembles the conventional wheel brake utilized in motor vehicles. It is to be understood, however, that the principles of the load control means of the invention are not limited to such brake structure, but rather that it is equally usable with other types of braking apparatus capable of absorbing power. For example, a conventional disc brake arrangement could be substituted for the present drum and brake shoe arrangement.

Obviously, many modifications and variations of the present invention are possible in the light of the above teachings.

I claim:

1. Load control means for controlling the retarding force characteristics of a rotary power absorber for absorbing driving torque from a shaft while said shaft is being driven by a prime mover, said power absorber including means for producing retarding force, and fluid pressure responsive means for causing said first-mentioned means to produce a retarding force to oppose said driving torque, comprising: means to be driven by the prime mover for producing an electric signal corresponding in value to, and varying as, the speed of rotation of the prime mover; fluid pressure control means operable in accordance with the value of said electric signal; and means for transmitting the controlled fluid pressure from said pressure control means to said fluid pressure responsive means to apply a retarding force of a corresponding value to the power absorber.

2. Load control means as defined in claim 1, wherein the means for transmitting the controlled fluid pressure varies the value of the retarding force directly with changes in the speed of rotation of the prime mover.

3. Load control means as defined in claim 1, wherein the means for transmitting the controlled fluid pressure varies the value of the retarding force in accordance with a mathematical function of the speed of rotation of the prime mover.

4. Load control means as defined in claim 1, wherein the value of the retarding force is varied substantially directly with speed and the horsepower absorbed varies substantially as the square of the change in speed of rotation of the prime mover.

5. Load control means as defined in claim 1, wherein the electric signal producing means is driven by the shaft and is a tachometer generator.

6. Load control means as defined in claim 1, wherein the fluid pressure control means is an electrically operated air valve connected in an electrical circuit with the signal producing means; and wherein a source of supply of air under pressure is connected with said air valve.

7. Load control means as defined in claim 6, wherein an air-pressure-to-hydraulic-pressure transducer is interposed between the air pressure control valve and the means for producing the retarding force.

8. Load control means as defined in claim 6, wherein an adjustable rheostat is connected in the circuit between the electric signal producing means and the electrically operated fluid pressure control valve.

9. Load control means as defined in claim 1, wherein the electric signal producing means is a tachometer generator.

10. Load control means as defined in claim 1, wherein the rotary power absorber is of the friction type, and wherein the means for producing the retarding force is fluid-pressure operated and includes friction brake means actuated by fluid under pressure, and wherein the load control means further includes a source of air under pressure; a conduit connected with said source of air pressure, said conduit being connectable with said fluid-pressure operated friction brake means; and wherein the fluid pressure control means is an electrically operated air valve that controls the pressure from said air source in accordance with the value of the electric signal being produced to correspondingly control the fluid pressure to said friction brake means, the value of said controlled air pressure being a preselected function of the speed of rotation of the prime mover.

11. Load control means as defined in claim 1, wherein the fluid pressure control means is an electrically operated air flow control valve; and wherein an air source supplies air under pressure to the air flow control valve inlet; and wherein means for transmitting the controlled air pressure from the air flow control valve outlet to the means for producing retarding force includes a transducer for transforming said controlled air pressure into liquid pressure.

12. Load control means as defined in claim 1 wherein the electric signal producing means is a tachometer generator operable to vary the value of the electric signal in response to variations in the speed of the prime mover; and wherein the fluid pressure control means is an air valve including a flow control element, and means regulating said flow control element, said last-mentioned means being connected to be actuated in accordance with the value of said electric signal.

13. A friction type power absorber for use in analyzing the performance of a prime mover, comprising: a brake shaft for receiving the driving torque from a prime mover; power absorption means including rotor means connected to receive driving torque from said shaft, stator means operatively disposed relative to said rotor means; friction brake means carried by one of either said rotor or stator means and movable into and out of frictional engagement with the other; and actuator means operable to apply force for moving said friction brake means into said frictional engagement to thereby apply retarding force to said rotor in opposition to driving torque applied thereto by said shaft, the value of said retarding force varying with the force exerted by said actuator means; and control means including means to generate an electric signal to actuate an element of a system for controlling said actuator means in accordance with the speed of rotation of said shaft so that the force exerted on said friction brake means by said actuator means varies as a function of said rotational speed and so that said retarding force is substantially zero at zero speed of said shaft and increases and decreases in value at a rate faster than said driving torque.

\* \* \* \* \*